May 13, 1924.　　　　　　　L. RICE　　　　　　1,493,703
SAFETY HOOK
Filed Jan. 29, 1924
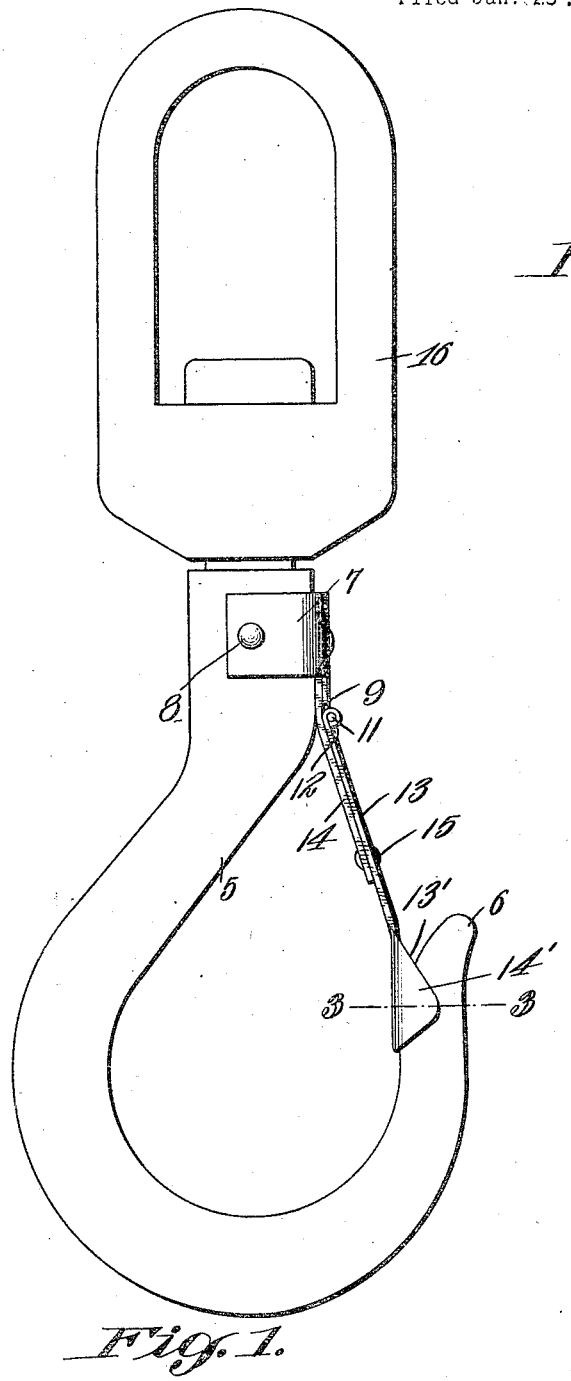
Fig. 1.
Fig. 3.
Fig. 2.
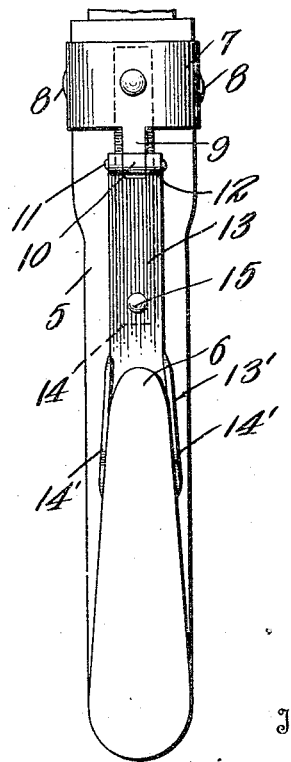
Inventor,
L. Rice
By C. A. Snow & Co.
Attorneys Patented May 13, 1924.

1,493,703

UNITED STATES PATENT OFFICE.

LEON RICE, OF ARCADIA, FLORIDA.

SAFETY HOOK.

Application filed January 29, 1924. Serial No. 689,378.

*To all whom it may concern:*

Be it known that I, LEON RICE, a citizen of the United States, residing at Arcadia, in the county of De Soto and State of Florida, have invented new and useful Safety Hooks, of which the following is a specification.

This invention relates to hooks and more particularly to hooks especially designed for use in connection with oil well apparatus, the primary object of the invention being to provide a novel form of hook for pulling sucker rods or rods used in oil well construction.

An important object of the invention is to provide novel means for automatically locking the hook to the elevator carried by the rod under operation by closing the usual entrance opening of the hook.

Another object of the invention is to provide a locking member so constructed that it will embrace portions of the hook at its free end in a manner to prevent lateral movement of the locking member which lateral movement would tend to render the hook inoperative.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is an elevational view of a hook constructed in accordance with the invention.

Figure 2 is a front elevational view of the hook.

Figure 3 is an elevational view taken on line 3—3 of Figure 1.

Referring to the drawing in detail, the hook is indicated generally by the reference character 5, the free end thereof being tapered as at 6 so that the hook may be inserted in the elevator carried on the end of the rod employed in well constructions.

The locking member embodies a base 7 which is in the form of a length of sheet metal bent to conform to the shape of the hook member, the body portion 7 being secured to the hook member as by means of bolts or the like indicated at 8.

Forming a part of the base 8 is a tongue 9 which has a portion thereof bent rearwardly providing a bearing 10 to receive the pin 11 that also passes through the bearings 12 forming a part of the locking arm 13, whereby the locking arm will be free to swing with respect to the base 7.

As shown, the locking arm has a widened end 13' which is constructed to provide lateral flanges 14' adapted to embrace a portion of the hook adjacent to the free end thereof, and prevent lateral movement of the locking arm with respect to the hook should lateral strain be directed thereto. These flanges are provided with inclined edges 15' that are engaged by the link or ring member of the rod to which the hook is secured to cause the arm to be moved out of engagement with the hook member and allow the hook to be readily and easily positioned. Mounted under the base 7 is a spring member 14 which is secured to the arm 13 at 15, the spring member 14 being constructed to normally urge the locking arm into close engagement with the hook member to prevent the hook member from becoming disconnected from the elevator on rod being pulled should slack occur in the cable or flexible member connected thereto.

The reference character 16 designates the usual swiveled head of the hook, which swiveled head allows for pivotal movement of the hook member with respect to its supporting member.

In view of the foregoing detail description, it is believed that a further detailed description as to the operation of the device is unnecessary.

I claim:—

In a hook, a body portion, a locking arm having pivotal connection with the body portion, the outer end of said locking arm being curved to provide lateral flanges, said lateral flanges adapted to embrace portions of the hook, and said flanges having inclined edges disposed adjacent to the hook to guide a link thereover.

In testimony that I claim the foregoing as my own, I have hereto affixed my signature in the presence of two witnesses.

LEON RICE.

Witnesses:
 LEWIS BISHOP,
 SAMMIE MILLS.